(12) United States Patent
Becker

(10) Patent No.: US 9,377,126 B2
(45) Date of Patent: Jun. 28, 2016

(54) CONTROL VALVE WITH INTEGRAL PRESSURE SWITCH

(71) Applicant: Schaeffler Technologies GmbH & Co. KG, Herzogenaurach (DE)

(72) Inventor: David Becker, Walled Lake, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 115 days.

(21) Appl. No.: 14/335,108

(22) Filed: Jul. 18, 2014

(65) Prior Publication Data

US 2015/0020901 A1   Jan. 22, 2015

Related U.S. Application Data

(60) Provisional application No. 61/856,935, filed on Jul. 22, 2013.

(51) Int. Cl.
  F16K 37/00   (2006.01)
  F16K 31/06   (2006.01)
  F16K 27/02   (2006.01)

(52) U.S. Cl.
  CPC ........... *F16K 37/0066* (2013.01); *F16K 27/029* (2013.01); *F16K 31/0655* (2013.01); *Y10T 137/8326* (2015.04)

(58) Field of Classification Search
  CPC   F16K 31/0655; F16K 27/029; F16K 37/0066
  See application file for complete search history.

(56) References Cited

U.S. PATENT DOCUMENTS

| | | | | |
|---|---|---|---|---|
| 4,582,294 A | * | 4/1986 | Fargo | F16K 31/0624 137/625.65 |
| 4,869,558 A | | 9/1989 | Yoshino | |
| 4,998,559 A | * | 3/1991 | McAuliffe, Jr. | F16H 61/0251 137/596.17 |
| 5,249,932 A | * | 10/1993 | Van Bork | F04B 43/0081 417/385 |
| 5,513,832 A | * | 5/1996 | Becker | F16K 31/0624 137/82 |
| 5,925,826 A | | 7/1999 | Kodama et al. | |
| 6,155,282 A | | 12/2000 | Zachary et al. | |
| 6,641,503 B1 | | 11/2003 | Bigi | |
| 2005/0269538 A1 | * | 12/2005 | Haynes | F16K 31/0606 251/129.15 |
| 2012/0061600 A1 | * | 3/2012 | Neff | F16K 31/0627 251/129.15 |
| 2014/0311586 A1 | * | 10/2014 | Becker | F16K 11/0704 137/15.21 |

\* cited by examiner

*Primary Examiner* — Craig Schneider
*Assistant Examiner* — Kevin Barss
(74) *Attorney, Agent, or Firm* — Volpe and Koenig, P.C.

(57) ABSTRACT

A control valve for hydraulic fluid is provided. The control valve includes a valve housing and a valve body slidably supported within the valve housing. The valve body has a hollow center defining a passage. The control valve includes a solenoid assembly having a solenoid housing, a coil, and an armature movable in an axial direction. The armature is in contact with an axial end of the valve body. The armature has a bore in fluid connection with the passage of the valve body. The solenoid housing includes a second passage in fluid connection with the bore. A diaphragm seals the second passage. A pressure sensor assembly is located adjacent to the diaphragm that detects a deflection of the diaphragm due to a pressure of the hydraulic fluid in the second passage.

13 Claims, 2 Drawing Sheets

CONTROL VALVE WITH INTEGRAL PRESSURE SWITCH

INCORPORATION BY REFERENCE

The following documents are incorporated herein by reference as if fully set forth: U.S. Provisional Application No. 61/856,935, filed Jul. 22, 2013.

FIELD OF INVENTION

This application is generally related to a control valve and more particularly related to a pressure switch for a solenoid control valve.

BACKGROUND

Pressure sensors for control valves are widely used in hydraulic and pneumatic pressure applications. The hydraulic pressure inside a control valve can be used for diagnostic purposes, such as emissions and mileage determinations. If the pressure inside a control valve is too high, the efficiency and performance of the associated components can suffer. Existing pressure sensors are typically external from solenoid control valves, such as disclosed in U.S. Pat. No. 6,641,503. Other known control valve pressure sensors are disclosed in U.S. Pat. Nos. 4,869,558 and 6,155,282. Known pressure sensors are typically too large to be integral with the control valve assembly, and are unable to withstand extreme temperatures experienced in control valves.

SUMMARY

It would be desirable to provide a compact, cost effective, and durable pressure sensor that is integral with a control valve assembly.

A control valve for hydraulic fluid is provided. The control valve includes a valve housing defining an axial end port, a first peripheral port, and a second peripheral port. A first seat is positioned in the valve housing between the axial end port and the second peripheral port, and a second seat positioned in the valve housing between the first peripheral port and the second peripheral port. A valve body is slidably supported within the valve housing. A first seal is located at a first axial end of the valve body for sealing against the first seat, and a second seal is located at a medial portion of the valve body for sealing against the second seat. The valve body has a hollow center defining a passage with a first opening located between the first axial end and the medial portion, and a second opening defined at a second axial end. The control valve includes a solenoid assembly having a solenoid housing, a coil, and an armature movable in an axial direction. The armature is in contact with the second axial end of the valve body. The armature has a bore in fluid connection with the passage of the valve body. The solenoid housing includes a second passage in fluid connection with the bore. A diaphragm seals the second passage. A pressure sensor assembly is located adjacent to the diaphragm on an opposite side from the second passage that detects a deflection of the diaphragm due to a pressure of the hydraulic fluid in the second passage.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the drawings.

DETAILED DESCRIPTION OF THE PREFERRED EMBODIMENTS

Figure 1:
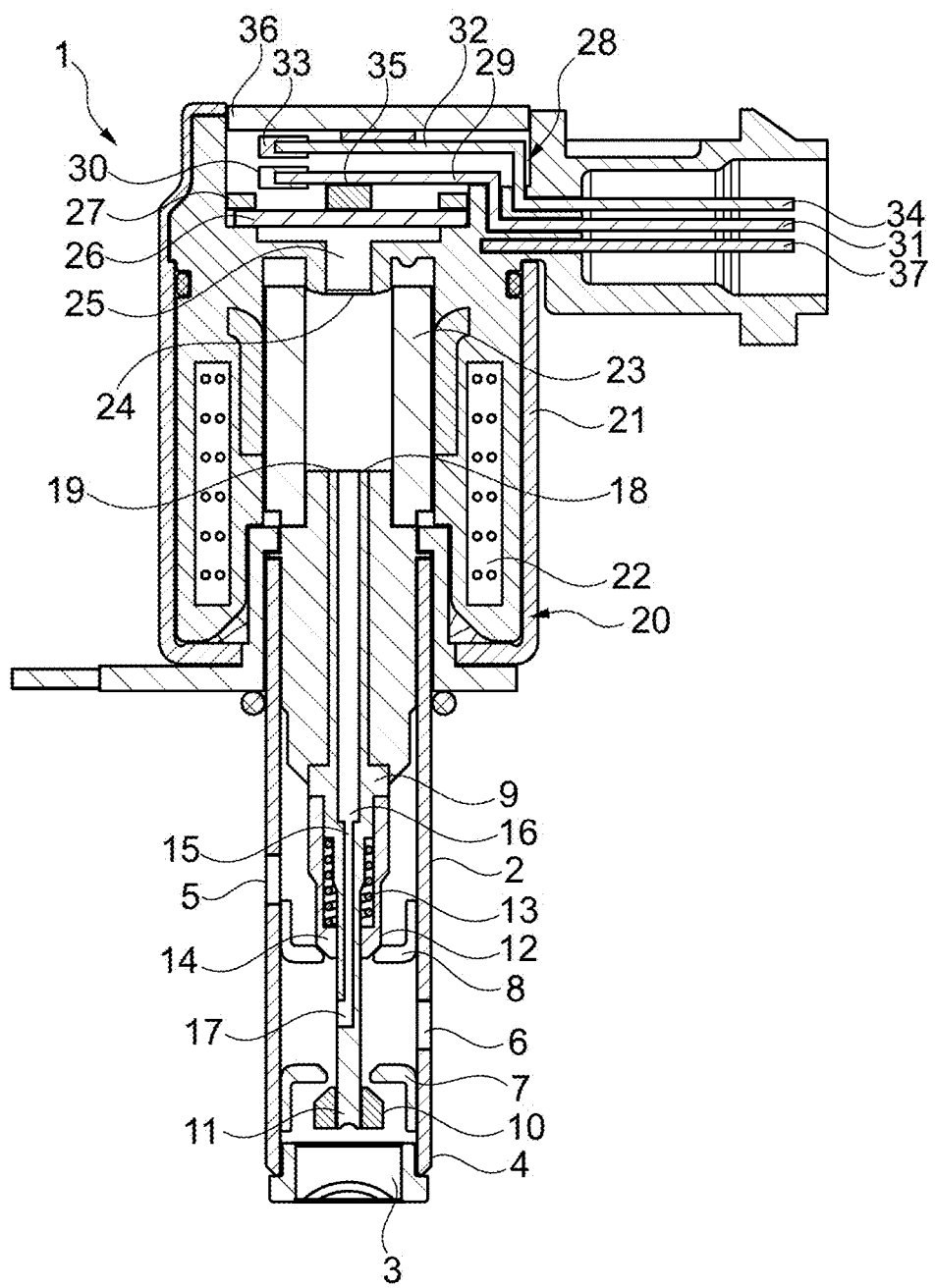
FIG. 1 is a cross sectional side view of a control valve according to the invention.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

FIG. 1 shows a preferred embodiment of the control valve 1 according to the present invention. The control valve 1 includes a valve housing 2 that defines an axial end port 3 at a first axial end 4, a first peripheral port 5, and a second peripheral port 6. Preferably, the axial end port 3 is a supply pressure port, the first peripheral port 5 is a tank port, and the second peripheral port 6 is a control pressure port. However, alternative arrangements of the supply pressure, tank, and control pressure ports can be used. A first seat 7 is positioned in the valve housing 2 between the axial end port 3 and the second peripheral port 6, and a second seat 8 is positioned in the valve housing 2 between the first peripheral port 5 and the second peripheral port 6.

A valve body 9 is slidably supported within the valve housing 2. The valve body 9 includes a first seal 10 at a first axial end 11 thereof for sealing against the first seat 7, and a second seal 12 is located at a medial portion 14 for sealing against the second seat 8. The second seal 12 is biased against the second seat 8 by a spring 13 so that a pre-defined amount of travel is required by the valve body 9 before the second seal 12 disengages from the second seat 8. The valve body 9 has a hollow center 15 defining a passage 16 with a first opening 17 located between the first axial end 11 and the medial portion 14, and a second opening 18 defined at a second axial end 19. During operation, the valve body 9 moves between three positions. In a first state, the valve body 9 is in an upper position within the valve housing 2, the first seal 10 presses against the first seat 7, and the axial end port 3 is sealed from the first and second peripheral ports 5, 6. In the first state, hydraulic fluid can flow between the first peripheral port 5 and the second peripheral port 6. In a second state, the valve body 9 is in a middle position, and the spring 13 is compressed due to hydraulic fluid pressure from the second peripheral port 6 exceeding a force of the spring 13 against the second seal 12. In a third state, the valve body 9 is in a lower position. As control pressure drains from the second peripheral port 6 and force from the hydraulic pressure decreases, the second seal 12 reseats against the second seat 8 via force from the spring 13, and a minimum pre-set pressure is maintained via the second peripheral port 6.

The control valve 1 includes a solenoid assembly 20 having a solenoid housing 21, a coil 22, and an armature 23 movable in an axial direction. The armature 23 contacts the second axial end 19 of the valve body 9 to push the valve body 9 axially within the valve housing 2. The armature 23 has a bore 24 or fluid path in fluid connection with the passage 16 of the valve body 9. The solenoid housing 21 includes a second passage 25 in fluid connection with the bore 24, such that hydraulic fluid travels from the first opening 17 of the valve body 9, through the bore 24 in the armature 23, to the second passage 25 in the solenoid housing 21. A diaphragm 26 seals the second passage 25. The diaphragm 26 can be a circular disc. The diaphragm 26 is preferably comprised of an elastomeric material. One of ordinary skill in the art recognizes that other suitable materials that are capable of deformation could be used for the diaphragm 26. In one particularly preferred embodiment, the diaphragm 26 is 15 mm in diameter and 1.5 mm thick, and is made of a fabric-reinforced silicone material. However, other dimensions may be used depending on the application.

Figure 2:
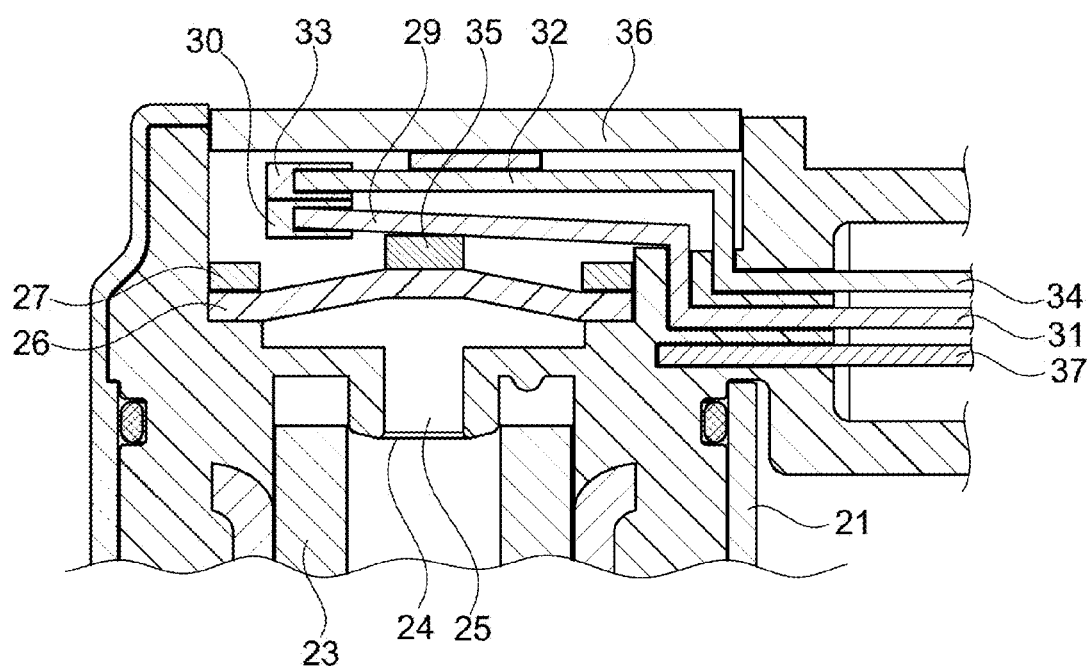
FIG. 2 shows an enlarged cross sectional view of a pressure sensor assembly with a diaphragm in a deflected state contacting the pressure sensor.

The control valve 1 includes an integral pressure sensor assembly 28 located adjacent to the diaphragm 26 that detects a deflection of the diaphragm 26 due to a pressure of the hydraulic fluid in the second passage 25. The deflection of the diaphragm 26 is shown in FIG. 2. A preferred embodiment of the pressure sensor assembly 28 includes a first leaf spring 29 with a first contact 30 and a first terminal 31, and a second leaf spring 32 with a second contact 33 and a second terminal 34 positioned adjacent to the first leaf spring 29. The first leaf spring 29 is positioned adjacent to the diaphragm 26 for movement by the deflection of the diaphragm 26. The stiffness of the first and second leaf springs 29, 32 can be adjusted depending on the application. A third terminal 37 can also be included to ground the first and second terminals 31, 34. In another preferred embodiment, the third terminal 37 can be a ground connection for the solenoid coil. In this embodiment, one of the other terminals 31, 34 could include a voltage to drive the coil. One of ordinary skill in the art recognizes the terminals 31, 34, and 37 can be arranged in a plurality of configurations.

A stop element 36 can be located at an axial end of the solenoid housing 21 that contacts the second leaf spring 32. The stop element 36 is axially adjustable within the solenoid housing 21 to adjust a location of the second leaf spring 32 relative to the first leaf spring 29. The stop element 36 can include a vent hole. A post 35 can be located between the diaphragm 26 and the first leaf spring 29 such that deflection of the diaphragm 26 against the post 35 causes the first contact 30 to touch the second contact 33, allowing current to flow across the first and second contacts 30, 33. When the first contact 30 touches the second contact 33, a signal is output indicating that the pressure inside the control valve 1 is too high. The pressure inside the control valve 1 is critical for diagnostic purposes of components associated with the control valve 1. The signal generated by the first and second contacts 30, 33 can be used to monitor the performance of components associated with the control valve 1, i.e. to determine emission and mileage values. One of ordinary skill in the art recognizes that any circuit logic system can be used for the pressure sensor assembly contacts 30, 33 and terminals 31, 34. In a preferred embodiment, the contacts 30, 33 are formed from a precious metal. Adjusting the location of the second leaf spring 32 relative to the first leaf spring 29 adjusts a threshold pressure of the hydraulic fluid that sets a trigger between the first leaf spring 29 and the second leaf spring 32. A ring seal 27 can be located adjacent to the diaphragm 26 to help seal the second passage 25. The ring seal 27 and the stop element 36 are press-fitted and staked in the solenoid housing 21.

Having thus described various embodiments of the present control valve in detail, it is to be appreciated and will be apparent to those skilled in the art that many changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1. Control Valve
2. Valve Housing
3. Axial End Port
4. First Axial End
5. First Peripheral Port
6. Second Peripheral Port
7. First Seat
8. Second Seat
9. Valve Body
10. First Seal
11. First Axial End of Valve Body
12. Second Seal
13. Spring
14. Medial Portion of Valve Body
15. Hollow Center of Valve Body
16. Passage in Valve Body
17. First Opening of Passage in Valve Body
18. Second Opening of Passage in Valve Body
19. Second Axial End of Valve Body
20. Solenoid Assembly
21. Solenoid Housing
22. Coil
23. Armature
24. Bore in Armature
25. Second Passage
26. Diaphragm
27. Ring Seal
28. Pressure Sensor Assembly
29. First Leaf Spring
30. First Contact
31. First Terminal
32. Second Leaf Spring
33. Second Contact
34. Second Terminal
35. Post
36. Stop Element
37. Third Terminal

What is claimed is:

1. A control valve for hydraulic fluid, comprising:
a valve housing defining an axial end port at a first axial end, a first peripheral port, and a second peripheral port, a first seat positioned in the valve housing between the axial end port and the second peripheral port, a second seat positioned in the valve housing between the first peripheral port and the second peripheral port,
a valve body slidably supported within the valve housing including a first seal at a first axial end of the valve body for sealing against the first seat, and a second seal at a medial portion of the valve body for sealing against the second seat, the valve body having a hollow center defining a passage with a first opening located between the first axial end and the medial portion, and a second opening defined at a second axial end,
a solenoid assembly including an armature movable in an axial direction with the armature in contact with the second axial end of the valve body, the armature having a fluid path in fluid connection with the passage of the valve body,
a diaphragm connected to the fluid path, and a pressure sensor assembly located adjacent to the diaphragm on an opposite side from the fluid path that detects a deflection of the diaphragm due to a pressure of the hydraulic fluid in the fluid path.

2. The control valve of claim 1, wherein the solenoid assembly includes a solenoid housing, and a coil, and the solenoid housing includes a second passage in fluid connection with the fluid path, and the diaphragm seals the second passage.

3. The control valve of claim 2, wherein the pressure sensor assembly comprises a first leaf spring with a first contact and a first terminal, a second leaf spring with a second contact and a second terminal positioned adjacent to the first leaf spring, the first leaf spring is positioned adjacent to the diaphragm for movement by the deflection of the diaphragm.

4. The control valve of claim 3, further comprising a stop element located at an axial end of the solenoid housing that contacts the second leaf spring.

5. The control valve of claim 3, further comprising a post between the diaphragm and the first leaf spring such that deflection of the diaphragm against the post causes the first contact to touch the second contact, allowing current to flow across the first and second contacts.

6. The control valve of claim 4, wherein the stop element is axially adjustable within the solenoid housing to adjust a location of the second leaf spring relative to the first leaf spring.

7. The control valve of claim 4, wherein the stop element includes a vent hole.

8. The control valve of claim 4, wherein a ring seal is located adjacent to the diaphragm, and the ring seal and the stop element are press-fitted and staked in the solenoid housing.

9. The control valve of claim 1, wherein the axial end port is a supply pressure port, the first peripheral port is a tank port, and the second peripheral port is a control pressure port.

10. A control valve for hydraulic fluid, comprising:
a valve housing,
a valve body slidably supported within the valve housing, the valve body having a hollow center defining a passage with a first opening located between a first axial end and a medial portion axially offset from the first axial end, and a second opening defined at a second axial end,
a solenoid assembly including an armature movable in an axial direction with the armature in contact with the second axial end of the valve body, the armature having a fluid path in fluid connection with the passage of the valve body,
a diaphragm connected to the fluid path, and
a pressure sensor assembly located adjacent to the diaphragm on an opposite side from the fluid path that detects a deflection of the diaphragm due to a pressure of the hydraulic fluid in the fluid path.

11. A control valve for hydraulic fluid, comprising:
a valve housing,
a valve body slidably supported within the valve housing, the valve body having a hollow center defining a passage with a first opening located between a first axial end and a medial portion, and a second opening defined at a second axial end,
a solenoid assembly including an armature movable in an axial direction with the armature in contact with the second axial end of the valve body, the armature having a fluid path in fluid connection with the passage of the valve body,
a diaphragm connected to the fluid path,
a pressure sensor assembly located adjacent to the diaphragm on an opposite side from the fluid path that detects a deflection of the diaphragm due to a pressure of the hydraulic fluid in the fluid path, wherein the solenoid assembly includes a solenoid housing, and a coil, and the solenoid housing includes a second passage in fluid connection with the fluid path, and the diaphragm seals the second passage.

12. The control valve of claim 11, wherein the pressure sensor assembly comprises a first leaf spring with a first contact and a first terminal, a second leaf spring with a second contact and a second terminal positioned adjacent to the first leaf spring, the first leaf spring is positioned adjacent to the diaphragm for movement by the deflection of the diaphragm.

13. The control valve of claim 12, further comprising a stop element located at an axial end of the solenoid housing that contacts the second leaf spring.

* * * * *